(12) United States Patent
Hewison

(10) Patent No.: US 11,878,831 B1
(45) Date of Patent: Jan. 23, 2024

(54) BOTTLENECK HAVING INTERNAL BAND AND DESTRUCTOR PROTRUSIONS

(71) Applicant: AIREWINE LLC, Harpswell, ME (US)

(72) Inventor: John A. Hewison, Harpswell, ME (US)

(*) Notice: Subject to any disclaimer, the term of this patent is extended or adjusted under 35 U.S.C. 154(b) by 170 days.

(21) Appl. No.: 16/899,815

(22) Filed: Jun. 12, 2020

(51) Int. Cl.
| B65D 1/02 | (2006.01) |
| B29D 22/00 | (2006.01) |
| B65D 23/04 | (2006.01) |
| B65D 47/04 | (2006.01) |

(52) U.S. Cl.
CPC ........... B65D 1/023 (2013.01); B29D 22/003 (2013.01); B65D 23/04 (2013.01); B65D 47/043 (2013.01)

(58) Field of Classification Search
CPC .. B65D 1/023; B65D 23/04; B65D 2501/009; B65D 39/00; B65D 39/08; B65D 47/043
USPC .................................. 222/547, 564; 215/40
See application file for complete search history.

(56) References Cited

U.S. PATENT DOCUMENTS

| 185,693 A | 12/1876 | Newton |
| 453,731 A | 6/1891 | Ford |
| 482,682 A * | 9/1892 | Heartfield ............... B65D 39/08 215/356 |
| 491,198 A | 2/1893 | Straus |
| 1,366,056 A | 1/1921 | Burns |
| 1,419,747 A | 6/1922 | Miller |
| 2,039,345 A | 5/1936 | Ravenscroft |
| 2,059,910 A | 11/1936 | Ravenscroft |
| 3,022,916 A | 2/1962 | Spooner |
| 3,677,435 A * | 7/1972 | Davis ................... B65D 43/021 220/366.1 |
| 5,417,336 A * | 5/1995 | Cortez ................. B65D 1/0223 215/386 |
| 8,485,503 B2 | 7/2013 | Lei |
| 8,714,385 B2 | 5/2014 | Jung et al. |
| 9,051,078 B2 | 6/2015 | Martini et al. |
| 9,321,556 B2 | 4/2016 | Kuiper et al. |
| 9,656,772 B2 | 5/2017 | Brozell et al. |
| 2007/0125720 A1* | 6/2007 | Stecca ..................... A47G 19/12 210/781 |
| 2010/0011967 A1 | 1/2010 | Barberio et al. |

(Continued)

FOREIGN PATENT DOCUMENTS

JP  2004149163 A  5/2004

OTHER PUBLICATIONS

Ghassemieh, et al. "The effect of nozzle geometry on the flow characteristics of small water jets." Proc. IMechE Part C: J. Mech. Eng. Sci., vol. 220, No. 12 (Dec. 2006), pp. 1739-1753. doi: 10.1243/0954406JMES430.

*Primary Examiner* — John K Fristoe, Jr.
*Assistant Examiner* — Jennifer Castriotta
(74) *Attorney, Agent, or Firm* — Rosenberg, Klein & Lee (57) ABSTRACT

A bottle body and bottle neck member for producing a liquid flow standing wave aesthetic effect when liquid is poured from the bottle. The bottle has at least a first continuously formed liquid flow band member extending around an inner neck member circumferential surface of the bottle body and at least one discontinuously formed band member extending at least partially around an internal neck member surface of the bottle neck member with the at least first continuously formed liquid flow band member being displaced from the at least discontinuously formed band member along an axis line of the bottle body and bottle neck member.

26 Claims, 8 Drawing Sheets

(56) References Cited

U.S. PATENT DOCUMENTS

2010/0264107 A1* 10/2010 Lonsway ............... B65D 1/023
                                                        215/40
2010/0270260 A1   10/2010 Jung
2013/0319253 A1* 12/2013 Smith ................. B01F 3/04751
                                                        99/323.1
2015/0203235 A1    7/2015 Laib et al.
2017/0073128 A1*  3/2017 Crawford ............. B65D 47/123

* cited by examiner

BOTTLENECK HAVING INTERNAL BAND AND DESTRUCTOR PROTRUSIONS

FIELD OF THE INVENTION

This invention directs itself to fluid mechanics and in particular to fluid dynamics which provides for the flow of fluids from an orifice. In particular, this invention relates to the flow of a Newtonian or non-Newtonian fluid from an orifice to provide an effective standing wave defined as a fluid flow which has peaks and troughs in substantially the same positional location throughout a fluid flow pouring process.

Still further, this invention directs itself to the provision of a substantially standing wave which provides for an aesthetic effect of a continuous flow stream having peaks/troughs of a fluid stream maintained in substantially the same positional location throughout at least a portion of a flow process.

Still further, this invention relates to a system whereby a liquid is poured from a bottle or other container orifice and gives the optical impression of a standing wave optical effect of a substantially standing wave of the liquid flowing therefrom at least throughout a portion of the pouring process.

Additionally, this invention is directed to a system whereby there is provided a bottle having a neck section through which a fluid flows whereby the fluid is disrupted and whereby an interference like pattern is produced to provide the peaks and troughs of a fluid stream to be maintained in substantially the same position during a pouring process.

Still further, the field of the invention is directed to the maintenance of a standing wave while liquid is being poured from a bottle.

Additionally, the field of the invention is directed to the flow of fluid from a container whereby the fluid is dispensed giving a visual impression of a fluid where the trough/peaks of the continuous fluid are maintained in the same location over a period of time.

Still further the field of invention pertains to a wide range of liquids, the subject invention concept is particularly adapted to wines where the mouth feel, alcohol content and other wine properties are highly determinable based upon viscosity measurements. Wine viscosity is based upon a number of components including ethanol, sugar and glycerol. Glycerol, for most wines is present in a concentration of about one tenth of the alcohol in most commercial wines. For most commercial wines at 25 degrees Centigrade, the viscosity approximates 1.4 mPa. Pure water has a viscosity of approximately 0.89 mPa which provides for a lower limit for the liquid of the subject concept.

BACKGROUND OF THE INVENTION

In general, when a liquid is dispensed from a container orifice under the influence of gravity assist, the falling stream of fluid will breakup into smaller droplets or packets as it is poured from a container and is dispensed by gravity assist. The vertical flow column of non-viscous liquid with a substantially circular cross section breaks into drops if its wavelength exceeds its circumference.

Instability of the fluid stream is associated with perturbations in the fluidic stream. There is a vibration in the liquid stream due to friction between an orifice edge and the liquid stream. Generally, the perturbations are resolved into sinusoidal components with some components growing with time while others decay with time during the pouring process. A measure of how many peaks and troughs per unit length is generally referred to as the wave number and the decay/growth is also a function of the radius of the cylindrical stream formed by the orifice.

When pouring a liquid from a bottle, such as for example a wine bottle, it has been found that the liquid stream breaks into droplets prior to being poured into a glass or other container.

It is the purpose and objective of the subject system to create a flow stream which maintains the peaks and troughs of a liquid stream to be visually observed in substantially the same positional location at least through a portion of the pouring of the liquid. The peaks/troughs are thus maintained in the fluid flow to provide an aesthetically pleasing effect of the dispensation of the fluid from the bottle or other container.

Numerous types of fluid flow formations and contours have been studied whereby at a trough the radius of the stream is smaller and in accordance with the Young Laplace equation the pressure due to surface tension is increased. At the peak, the radius of the stream is larger and pressure due to the surface tension is reduced. Thus, it is expected that the higher pressure in the trough would squeeze liquid into the lower pressure region of the peak, however, there are two separate radius components (the peak and the trough) and since the radius of the curvature at the trough would be negative, it decreases the pressure in the trough and in the same manner the radius of the curvature at the peak becomes positive and increases the pressure in that area.

The above effects do not completely cancel each other and, in general, one of the effects will have a greater magnitude than the other depending upon the wave number of the initial radius of the stream. When the wave number is such that the radius of curvature of the wave would dominate the radius of the stream, the components decay over time and when the effect of the radius of the stream dominates the curvature of the wave, the effects grow with respect to time. This results in the stream forming droplets and not providing a stroboscopic effect of the fluid flow as the liquid is being dispensed.

Numerous configurations for containers/bottles have been provided so that the contents contained in the body portion of a bottle are to be smoothly discharges as opposed to an abrupt discharging of the liquid at an excessive pressure. This results in droplets or gushing of the liquid into a stream which is non-homogeneous and which may cause the stream to break into droplets which can be splashed on the user and/or into the surrounding environment, thus destroying the standing wave effect.

Liquid, such as wine, for example, being poured from a bottle would be generally emitted in a spurt-like configuration rather than a continuous/steady stream and in particular, does not produce the aesthetic effect of a standing wave.

In general, the pouring of the liquid floods the neck section which would then cause at least a partial vacuum forming in the bottle. As volume is depleted from the container or bottle, adjustment of the pouring angle is necessary which requires concentration and experience of the pourer. In prior rituals of wine pouring, such results in overfilling and spillage due to the difficulty to smoothly pour a liquid from a container having an elongated and narrow neck that is filled with wine or other like liquid.

The spurting behavior of any liquid being poured from a bottle is based upon fluid mechanism principles such that gravity draws the liquid through the generally narrow opening of the neck of the bottle. Force is acting on the column of liquid in a container which include reactive forces from the differential pressure of the atmosphere of the environment within and external to the bottle.

When containers with narrow necks are inclined at an angle for facilitating the pouring of the pouring of the liquid, there generally results in a smooth or continuous liquid stream from the opening of the neck of the container due to the force of gravity acting upon the liquid being poured. However, further displacement from the bottle generates a negative pressure or partial vacuum formed within the air space directly behind the liquid. Air intermittently enters into the downstream flow for equalization of pressure of the air space in the container by injecting bubbles of air into the stream offsetting a volume of the wine or other liquid which generally disrupts any continuous flow.

Pressure of the discharged fluid or liquid varies over time as air is sporadically emitting into the bottle and the flow of the liquid is interrupted consequently. The divergence of incoming air results in the objectionable spurting or clogging property which affects the trajectory of the fluid exiting the opening of the inclined bottle.

PRIOR ART

A number of containers have been fabricated which provide for projections internal to the container dispensing section which provide for changes in the fluid pattern of the fluid being dispensed from the container.

The Jung Patent Application Publication 2010/0270260 is directed to a bottle which contains liquid contents and includes a plurality of spirally positioned guides so that the liquid contents are smoothly/stably discharged through an opening of the bottle where the liquid spirally revolves within the bottle. However, the configuration and guides or projections provided in the patent application do not result in a standing type wave of the liquid being dispensed.

Patent Application Publication 2015/0203235 is directed to another type of bottle having internal projections which project in a radially inward direction from the interior surface of the neck. These projections can be linear or in other geometrical shapes and are directed to projections which extend substantially in a longitudinal direction concurrent with an axis of the bottle or other container. This is similar to the Jung Patent Application which provides for a spiral flow of the liquid, but does not provide for an interference pattern for the flow resulting in a standing wave of the fluid being dispensed.

The Rabenscroft Patent U.S. Pat. No. 2,039,345 shows a bottle mount with a singular internal projection to provide a somewhat blockage of the flow of liquid being dispensed from the bottle, but this does not provide for the development of an interference pattern between troughs and peaks of the liquid being dispensed.

The Rabenscroft Patent U.S. Pat. No. 2,059,910 provides for a lateral intrusion from the internal surface of a bottle neck and forms an aperture which includes a spout-like passage to allow the liquid to be poured in minute manners without splashing. However, such throat areas creating the protrusion do not provide for a series of barriers/disrupters which result in the fluid having a somewhat interference-like pattern to provide a substantially standing wave of the liquid being poured.

The Barbrio Patent Application Publication 2010/0011967 is directed to a wine pouring regulator system which provides a percolation labyrinth to be used in association with a regulating cartridge to apparently cause a turbulent flow of the wine within an aeration region. Such is used for aeration and providing a uniform flow rate to reduce dripping and splashing of the wine during the pouring process. However, as in other prior art known to Applicant, such does not provide for the establishment of an interference type pattern of the fluid.

The Ford Patent U.S. Pat. No. 453,731 is directed to a bottle which includes a ring of projections formed on the interior surface of the bottleneck. However, the projections are used for prevention of a cork other stopping device from being forced inward beyond the projections. These projections do not provide for turbulent or laminar dispensation of the liquid in the manner such that a standing wave would be achieved.

The Miller Patent U.S. Pat. No. 1,419,747 is directed to a bottle which includes a restricted area formed by circumferentially extending ledge for preventing the unauthorized use of a cork being inserted into the bottleneck. However, the singular ledge formed does not provide for a series of fluid flow passages which permit an interference-like pattern to be formed.

SUMMARY OF THE INVENTION

The subject system is directed to a bottle having a bottle body adapted to contain a liquid such as wine or other type liquid. The bottleneck member is connected to the bottle body with the bottleneck member having an axis line with an internal neck member circumferential surface. A continuously formed liquid flow band member is secured to the internal neck member surface and extends continuously around the internal neck member circumferential surface. A discontinuously formed liquid flow band is secured to the internal neck member surface and extends at least partially around the internal neck member circumferential surface. The discontinuously formed liquid flow band has at least a pair of liquid passages formed there through in the direction of the axis line and extends in a direction of the axis line. The discontinuously formed liquid flow band is locationally displaced from the first continuously formed liquid flow band member by a distance along the axis line.

An object of the subject system is to provide an interference flow pattern of the liquid from the bottleneck member.

A further object of the subject system is to provide a liquid flow being dispensed from the bottle to provide a substantially standing wave aesthetic effect as liquid is poured from the bottle.

Still further, an object of the subject system is to provide a continuous and homogeneous flow of liquid from the bottle as it is being dispensed.

A still further object of the subject system is to reduce air into the stream from the external environment for disrupting any laminar flow of the liquid.

A still further object of the subject system is to provide a discontinuously formed liquid flow band in combination with a continuously formed liquid flow band whereby there is provided at least a pair of liquid passages formed through the discontinuously formed liquid flow band where the passages are positionally located substantially circumferentially equidistance from each other and on opposing angular sides of the axis line of the bottleneck member.

A further object of the subject system is to provide at least one continuously formed liquid band member defining a disruptor band formed in the bottle neck of a bottle in combination with at least one discontinuously formed liquid band member defining a barricade which would result in a standing wave aesthetic effect as the liquid is being poured.

DESCRIPTION OF THE PREFERRED EMBODIMENTS

Figure 1:
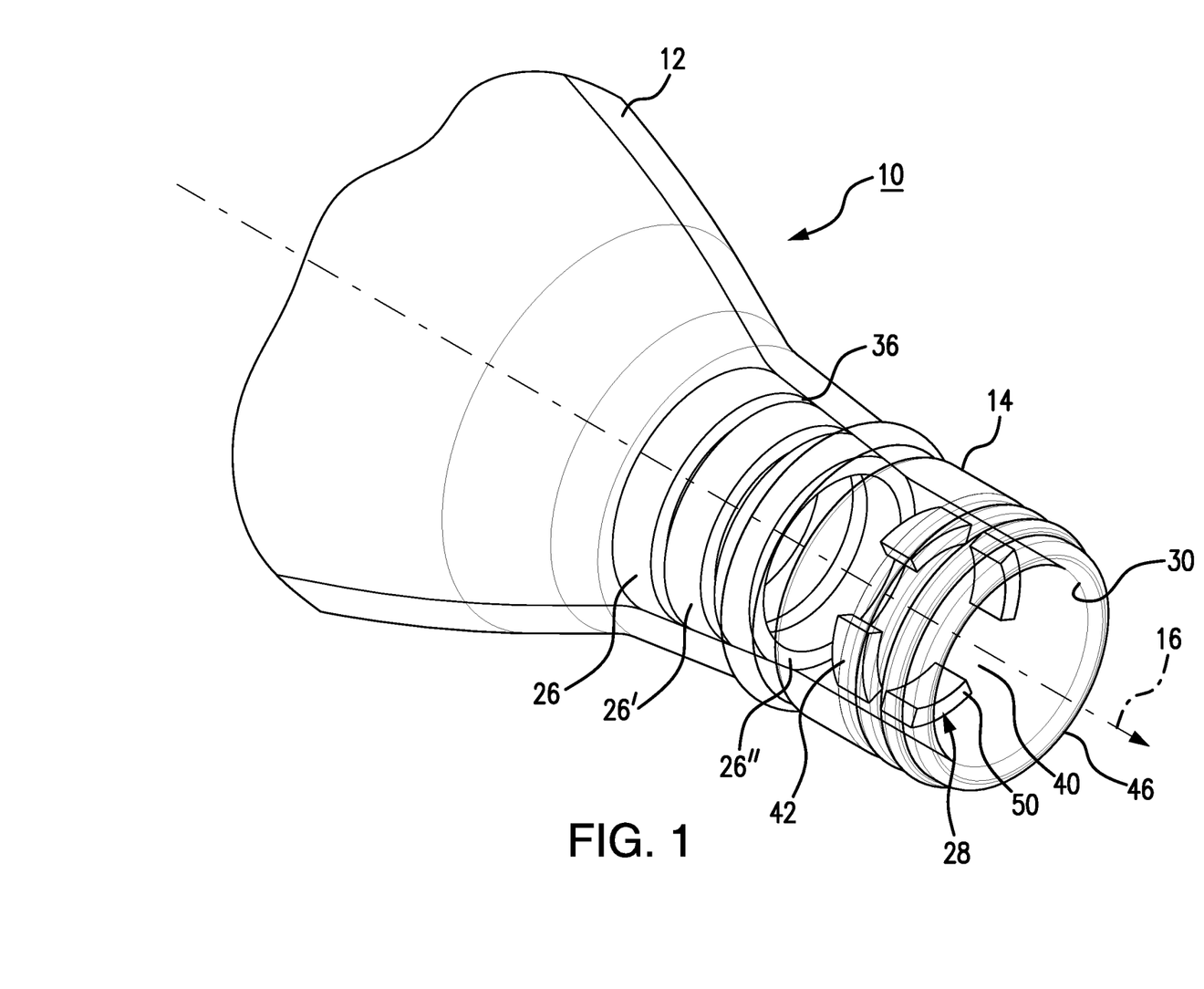
FIG. 1 is a partially cut-away schematic drawing of a preferred embodiment of a bottle containing liquid to produce a liquid flow contour simulating a fluidic standing wave when liquid is being poured from the bottle.
Figure 4:
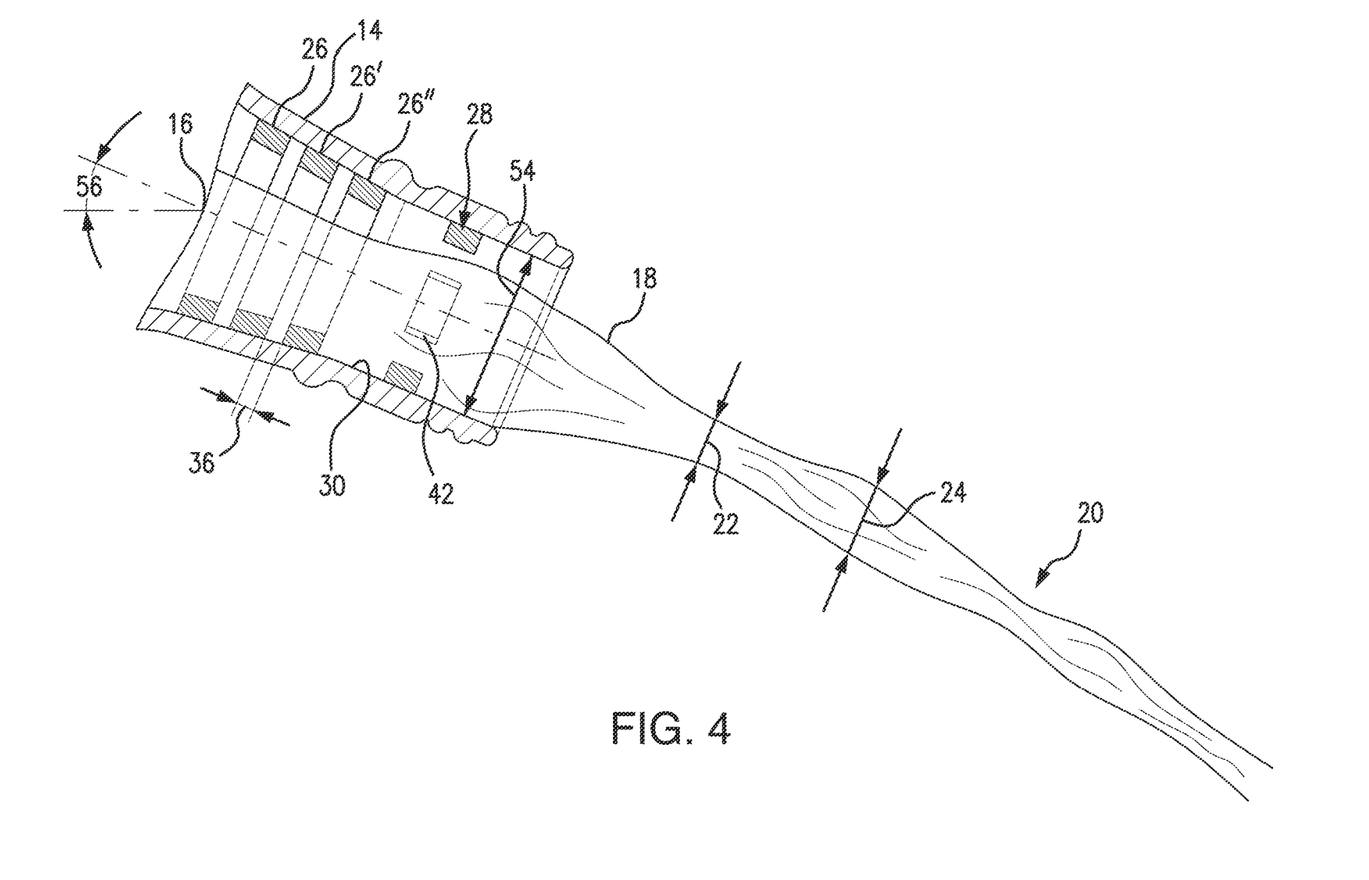
FIG. 4 is a partially cut away view of the bottle showing the liquid flow contouring as liquid is being dispensed from the bottle.

Referring to FIGS. 1 and 4, there is shown bottle 10 which contains a liquid to be dispensed or poured from bottle 10 in a manner shown in FIG. 4. The concept of bottle 10 is that a bottleneck member 14 is connected to the bottle body 12 in one piece fashion through molding or some other adherence manner to form with the bottle neck member 14 having an axis line 16 where liquid 18 is poured from the bottle 10 in a predetermined pattern giving the visual impression of a somewhat standing wave where troughs and peaks of the liquid being poured appear to remain in one location as the liquid is being poured, as will be discussed in following paragraphs.

Figure 5:
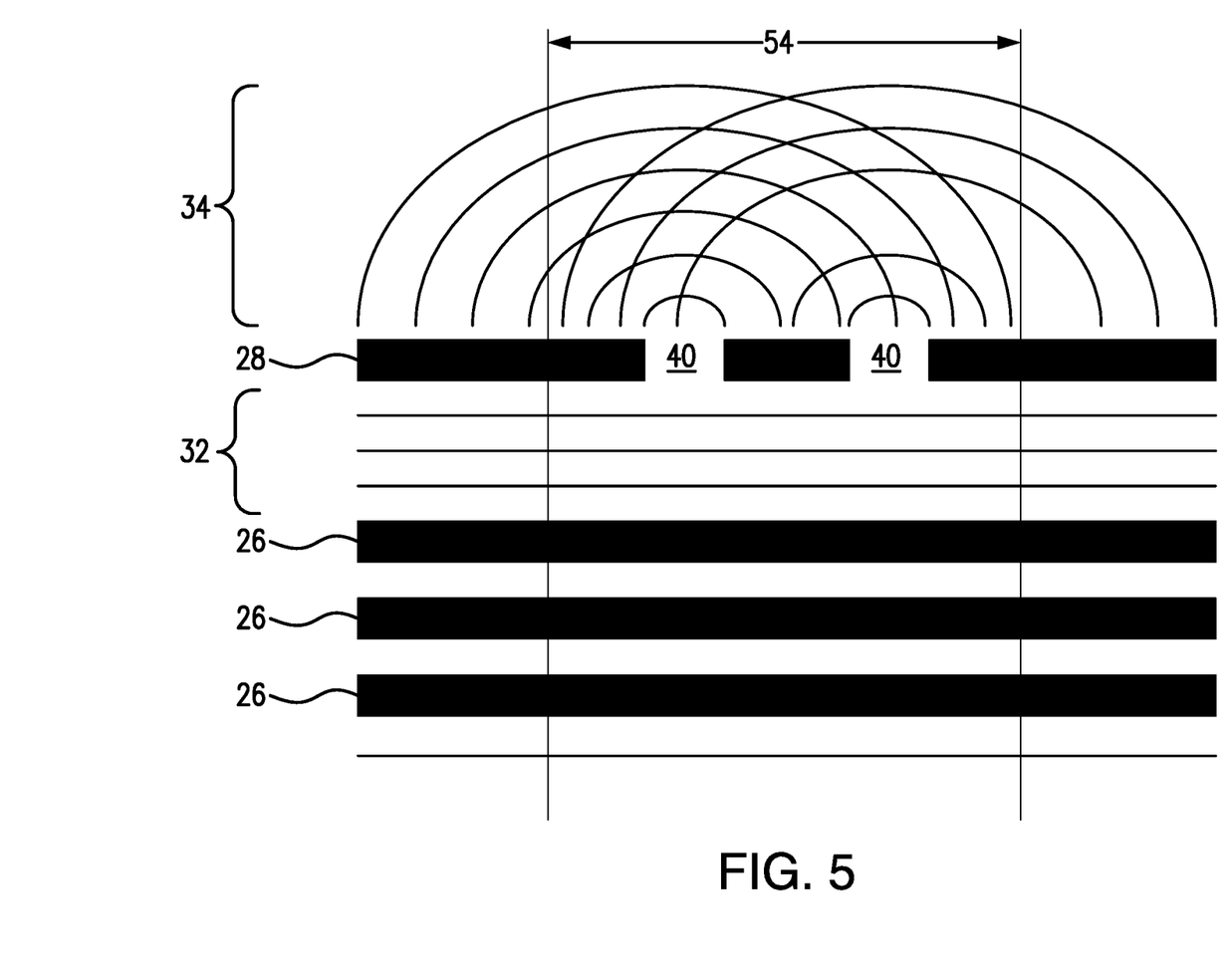
FIG. 5 is a diagram showing an analogous interference pattern produced as the liquid is being poured from the bottle.
Figure 6:
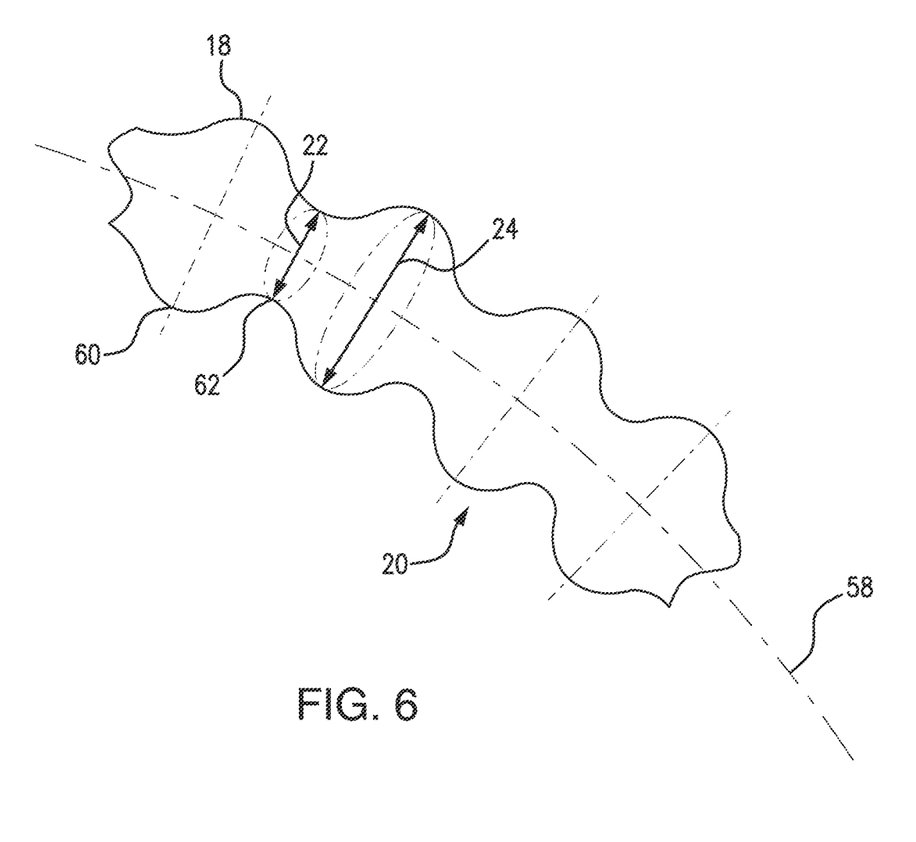
FIG. 6 is a conceptualized model schematic drawing showing the peaks and troughs of liquid being poured producing a standing wave aesthetic effect.

As is seen in FIGS. 4-6, the object of the subject concept is to provide a liquid pattern 20 of liquid 18 which forms an interference flow pattern as liquid 18 is being poured to provide a substantially liquid flow standing wave aesthetic effect during the pouring process as liquid is dispensed from bottle 10 into a glass or other container. The concept is dependent upon a number of fluid dynamic properties associated with the pouring process including rate of fluid discharge, orifice diameters, viscosity of the fluid being displaced, pressure differentials, laminar or turbulent flow produced as well as other geometric considerations. In general, the liquid pattern in prior art techniques has been found to rely primarily on the skill of the user dispensing the liquid to produce a particular aesthetic effect of liquid pattern 20.

In general, the tilt angle 56 shown in FIG. 4 is maintained between 10-45 degrees to obtain a substantially smooth and continuous flow of the liquid being dispensed. As shown in FIG. 5, a conceptual model is presented showing an interference pattern being formed as the liquid or other wave function passes through one or more continuously formed liquid band members to produce a plane wave 32 prior to passing through at least one discontinuously formed liquid band member containing liquid passages 40 or slits formed therethrough. In this manner, in accordance with the subject bottle structure, an inference pattern 34 is achieved which results in a liquid pattern having a plurality of peaks and troughs defined respectively by the wave minimum diameters 22 and wave maximum diameters 24 which create a substantially standing wave visualization during the liquid pouring process.

Referring to FIG. 6, it is seen that during the pouring process, the liquid being dispensed substantially follows a parabolic flow line direction 58 due to gravity assist. This creates a series of peaks 60 and troughs 62 in the liquid pattern 20 during the pouring process.

As developed through the structure of bottle neck member 14 there is produced a continuous liquid flow pattern 20 where an undulating liquid pattern 20 is provided in the form of an undulating wave having wave minimum diameters 22 (associated with the troughs 62) and wave maximum diameters 24 (associated with the peaks 60) which provide for the aesthetic effect of a standing wave. In general, the liquid 18 being dispensed from bottle neck member 14 results in a somewhat stroboscopic effect whereby the liquid 18 dispensed appears to be maintained as a standing wave with all liquid particles being in a substantially fixed location during the pouring process.

In order to achieve liquid wave pattern 20, as is seen in FIGS. 4-6, one or more continuously formed liquid band members 26 are molded to or otherwise secured to inner surface 30 of bottle neck member 14 in order to produce a substantially plane wave 32 prior to passage through a discontinuously formed liquid band member 28 to produce the interference pattern 34.

Figure 3:
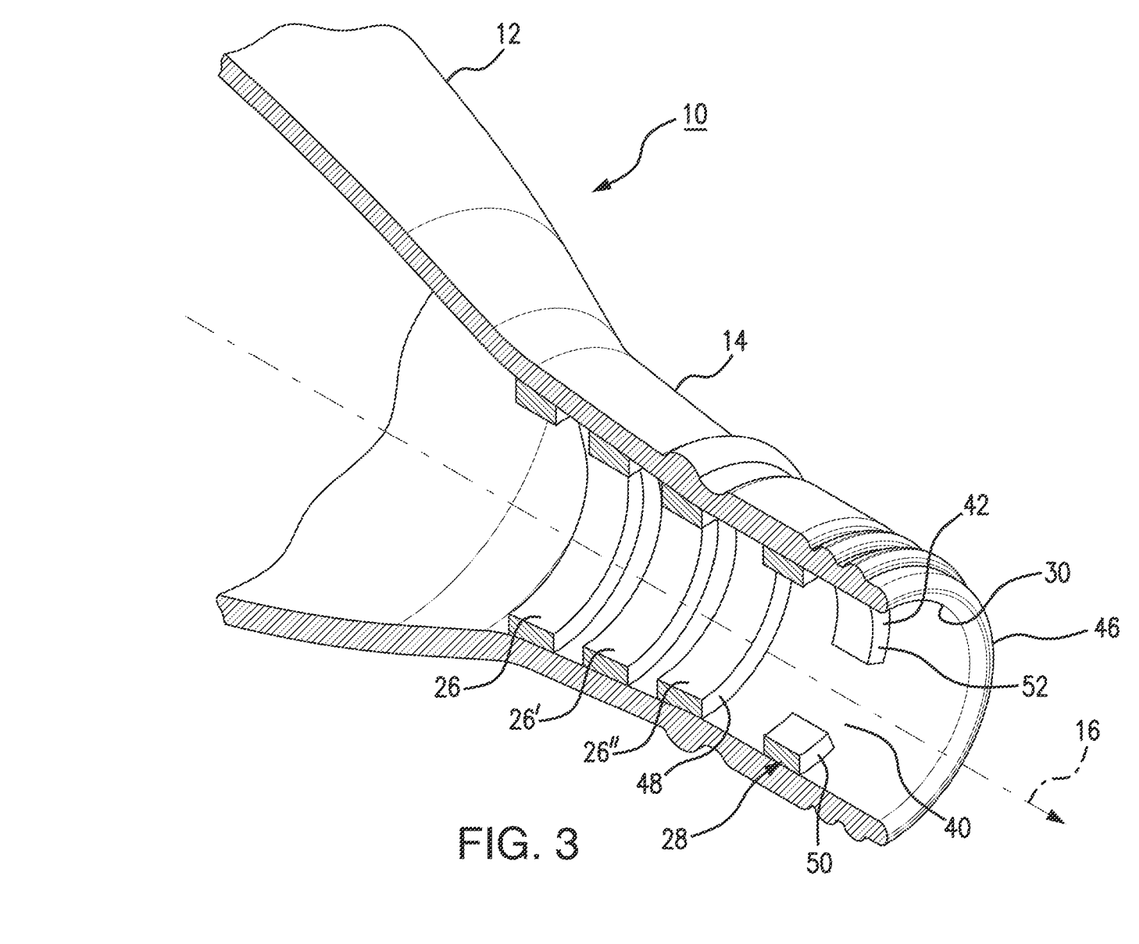
FIG. 3 is a schematic, partially cut-away view of the bottle showing three continuously formed liquid flow band members axially displaced from a discontinuous liquid flow band member.

As seen in FIG. 3, there is provided three continuously formed liquid band members 26, 26' and 26" which are formed in one-piece formation with bottle neck member 14, or alternatively, secured thereto in a fixed manner through adhesive or some like technique. Liquid band members 26, 26' and 26" are each formed in a continuous unbroken manner throughout the circumferential extension of each liquid band member 26, 26' and 26". Each continuous liquid band member 26, 26' and 26" may have a rectangular cross-section contour as shown or alternatively be in the form of an arcuately directed ring. The important consideration being that the continuous liquid band members 26, 26' and 26" be unbroken in their circumferential extensions. Liquid band members 26, 26' and 26" may be formed of glass, a plastic composition or other like material not important to the invention concept with the exception that the composition be compatible with the composition material of the bottle 10 and be of sufficient structural integrity to accept the structural load of the liquid passing therethrough.

As further seen in FIG. 3, at least one discontinuously formed liquid band member 28 is displaced from continuously formed liquid band member 26" along axis line 16 where at least one flow block member 42 is formed providing at least two liquid passages 40 to permit fluid or liquid to pass therethrough. As is the case of the continuous liquid band members 26, 26', and 26", the discontinuously formed liquid band member 28 may be formed in one piece formation with bottle neck member 14 through molding or other adherence technique to the inner surface 30 of bottle neck member 14. Discontinuously liquid band member 28 may be formed of a glass composition, plastic or other like material similar to continuously formed liquid band members 26, 26', and 26".

In this manner, it has been found that a substantially plane wave 32 of liquid 18 is formed prior to the liquid passing through discontinuously formed liquid band member 28 to produce an interference pattern 34 which has been found to result in the liquid pattern 20, as shown in FIG. 4. Through use of one or more continuously formed liquid band members 26 in combination with at least one discontinuously formed liquid band member 28, the liquid pattern 20 is converted into the interference pattern 34. Conversion of the plane wave flow 32 into interference flow pattern 34 has been found to result in the standing wave effect as liquid 18 is dispensed from bottle 10 through bottle neck member 14. As is seen in FIGS. 1-4, bottle neck member 14 and bottle body 12 may be formed in one-piece formation through molding, or some like technique. Additionally, bottle body 12 and bottle neck member 14 constituting bottle 10 may be formed of either glass, a closed cell plastic composition, or other composition not important to the inventive concept as herein described, with the exception that bottle 10 formed of bottle body 12 and bottle neck member 14 are of structural fabrication such that liquid 18 may be contained therein.

As is seen in FIGS. 1, 3-4, where a series of continuously formed liquid band member 26 are provided, each of the continuously formed liquid band member 26 is displaced from a succeeding continuously formed liquid band member 26 by a predetermined distance to optimize the flow of liquid 18 and produce a substantially plane wave 32 of liquid 18 flowing over continuously formed liquid band members 26. In general, displacement distances 36 of sequentially arranged continuous liquid band members 26 are maintained to provide plane wave 32 prior to liquid being passed through discontinuously formed liquid band member 28.

Figure 2:
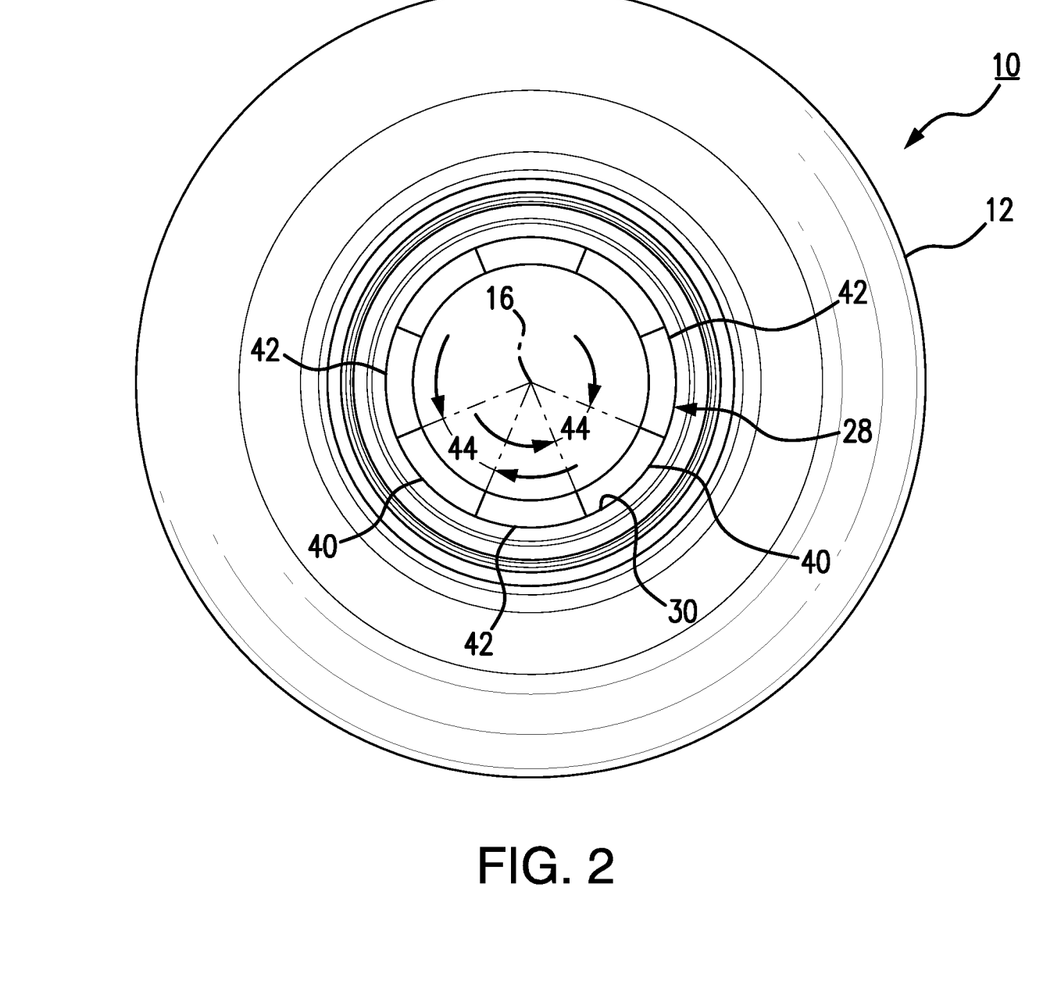
FIG. 2 is a schematic enlarged plan view of the bottle showing the bottle neck area containing both at least one discontinuously and one continuously formed liquid flow member combination with orientation of liquid flow passages formed in the discontinuously formed liquid flow member.

Discontinuously formed liquid band member 28 is secured or otherwise fixed to internal neck member surface 30 (having an internal diameter 54), as shown in FIG. 4 and extends at least partially around internal neck member surface or internal neck member circumferential surface 30 in a manner depicted in FIGS. 1-4. As seen in FIG. 2, discontinuously formed liquid band member 28 is composed of a plurality of flow block members 42 positioned around the entire circumferential inner surface of bottle inner surface 30 of bottle neck member 14. Positioning of flow block members 42 and liquid passages 40 determine the interference pattern 34 of liquid 18 being poured or dispensed from bottle 10. Liquid passages 40 and flow block members 42 are located in a manner such that liquid flow passages 40 on opposing sides of a flow block member 42 provide for the same cross-sectional area between adjacent liquid passages 40. Additionally, the center of the circumferential distance of each liquid passage 40 is generally identical to a next succeeding liquid passage 40 in order to maintain a liquid flow pattern 20, as shown in FIG. 4. As seen in FIG. 2, each succeeding liquid passage 40 interspersed by a flow block member 42 has a liquid passage radial angle 44 formed with axis line 16 where each of the liquid passage radial angles 44 are equal each to the other.

Liquid passages 40 and flow block members 42 are located in a manner such that liquid flow passages 40 on opposing sides of a flow block member 42 provide for the same cross-sectional area between adjacent liquid passages 40. Additionally, the center of the circumferential distance of each liquid passage 40 is generally identical to a next succeeding liquid passage 40 in order to maintain a liquid flow pattern 20, as shown in FIG. 4. As is seen in FIG. 2, each succeeding liquid passage 40 interspersed by a flow block member 42 has a liquid passage radial angle 44 formed with axis line 16 where each of the liquid passage radial angles 44 are equal each to the other.

Symmetry throughout the circumferential length of discontinuously formed liquid band member 28 is of importance in producing a substantially standing wave liquid pattern 20 in order that peaks and valleys of liquid 18 being dispensed are maintained in substantially the same location during the pouring of liquid 18.

Flow block members 42 may be formed in one-piece formation with bottle and bottle neck member 14 or otherwise secured to inner surface 30 of bottle neck member 14 through adhesive or some like technique not important to the inventive concept as herein described, with the exception that flow block members 42 have a structural integrity which permits a fixation to inner surface 30 and can accept the force loading associated with liquid 8 being poured. Flow block members 42 constituting discontinuously formed liquid band member 28 is displaced along axis line 16 from continuously formed liquid band members 26 and bottle neck lip 46, as is seen in FIGS. 1 and 3-4.

It has been found that positional location and sizing of both the discontinuously formed liquid band members 28 and continuously formed liquid band members 26 is of importance in obtaining a substantially standing wave of liquid 18 being dispensed from bottle 10. There is always vibration in the liquid stream pattern 20 due in part to some friction developed between the liquid interface with the bottle neck member 14, and the sizing of a radius of the liquid 18 being poured. Due to the fact that some vibration would exist, perturbations include some components which will grow with time while others decay. In order to minimize this type of anomaly which would result in a non-standing wave, positional location of continuous and discontinuous bands 26, 28 has been found important to provide the desired aesthetic effect. Decay/growth of pattern 20 is a function of the measure of how peaks 60 and troughs 62 are found per unit length which is commonly referred to as the wave number in combination with the radius of the cylindrical stream radius. At the minimum wave number in combination with the radius of the cylindrical stream radius. At the minimum wave diameter 22, the overall radius of the liquid pattern flow stream 20 is less and in accordance with the Young-Laplace equation, the pressure due to surface tension is increased. In a similar manner, at the peak, or maximum wave diameter 22, the radius of the stream is larger and pressure drop due to surface tension is reduced.

The Young-Laplace equation is influenced by additional separate radius components which would be the radius of the liquid pattern 20 and another component is the radius of curvature of the wave itself.

In order to maintain a substantially constant wave minimum diameter 22 and wave maximum diameter 24 in the same positional location over a period of time, it has been found that the fabrication of the continuously formed liquid flow band member 26 would have a substantially cross-sectional contour with a cross-sectional area within the approximate range of 0.02-0.04 square inches. The liquid viscosity is within the approximate range of 0.89 to 1.4 mPa. The inner surface 30 of the bottle neck member 14 has a diameter within the approximate range of a radius between 0.5-0.75 inches. In order to obtain a plane wave 32, the uppermost continuously formed liquid band member 26 has been found to give an optimum effect when continuously formed liquid flow band member 26 is positionally located within the range of 0.75-1.25 inches from neck lip section 46 of bottle neck member 14.

Additionally, where a plurality of continuously formed liquid band members 26 are positioned and fixed to inner surface 30 of bottle neck member 14, such are displaced each from the other in the approximate range of 0.1-0.2 inches, each from the other. Additionally, each of continuously formed liquid band members 26 are formed in a plane which is substantially parallel to a next succeeding continuously formed liquid band member 26.

In a preferred embodiment as shown in FIGS. 1 and 3-4, a series of continuously formed liquid band members 26 having dimensions and positional locations previously described provides for a substantial liquid pattern 20 which optimizes the stationary effect of liquid pattern 20 being dispensed from bottle 10. Thus, a preferred embodiment includes a series of two or three continuously formed liquid band members 26 spaced apart from each other and parallel each to the other in the range of 0.1-0.2 inches. Additionally, each of the continuously formed liquid band members 26 provide for the same cross-sectional areas within the range of 0.02-0.04 square inches with the last in the series of continuously formed liquid band members 26 being positioned within the range of 0.75-1.25 inches from neck lip 46.

Each of continuously formed liquid band sections 26 are displaced from a next sequential band 26 within the range of substantially 0.1-0.5 inches with respect to axis line 16. Each of continuously formed liquid band members 26 are substantially cross-sectional and are defined by a rectangular contour.

Referring now to FIGS. 1-4 and in particular to FIG. 2, there is provided at least a pair of liquid passages 40 formed within discontinuously formed liquid band member 28 and are positionally located substantially circumferentially equidistant each from the other around the inner surface 30 of bottle neck member 14. Additionally, liquid passages 40 are formed on opposing sides of opposing angular sides of axis line 16 to provide an equal arc length defined by an arc length of each of said liquid passages 40. In order to provide liquid pattern 20, it has been found that each pair of liquid flow passages 40 have a cross-sectional area equal to a corresponding cross-sectional area of an adjacent flow passage which are blocked by a respective intervening flow block member 42.

Thus, each of liquid passages 40 includes an arc length substantially equal to a corresponding arc length of a respective flow passage 40 to provide substantially equal cross-sectional areas of each of said flow passages 40. As indicated, the arc length of each of said liquid passages 40 is equal to each other for all liquid flow passages 40 throughout the circumferential distance of said inner surface 30 of bottle neck member 14.

Where the plurality of flow passages 40 are greater than two, the flow passages are symmetrically disposed around the circumference of inner surface 30 with each of the flow passages 40 being diametrically opposed to a corresponding flow passage to provide a symmetrical positioning of flow passages 40 throughout the circumference of inner surface 30 of bottle neck member 14.

As shown in FIG. 3, each of the intervening block members 42 includes an upper surface 50 or 52, respectively, of discontinuously formed liquid band member 28 within the approximate range of 0.3-0.4 inches from neck lip section 46.

Due to the overlapping, dependent and independent parameters experienced during a pouring process, the obtaining of a substantially standing wave is highly empirical. After a number of experimental trials and tests it has been found the embodiment of the subject bottle which produces an optimized standing wave during the pouring process is described for the configuration shown and described in FIGS. 1-3 and 4. However, empirical data has supported the idea that a slightly non-optimized configuration as set up in FIGS. 7 and 8, although showing a slight movement or displacement of the troughs/peaks during the pouring process still provides for a pleasing aesthetic effect.

Figure 7:
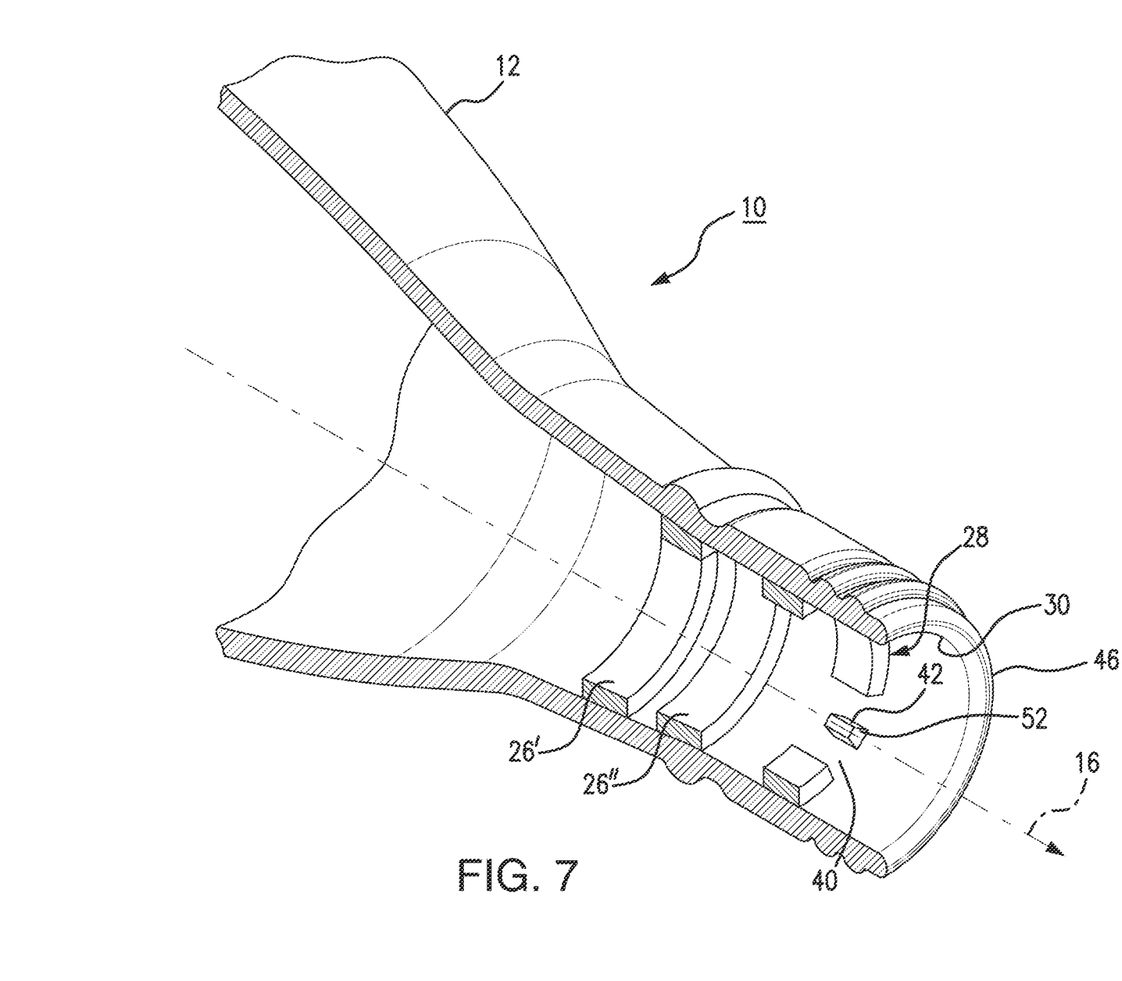
FIG. 7 is a further embodiment of the subject invention showing schematically and in cut-away a bottle having two continuously formed liquid flow band members displaced from a discontinuously formed liquid flow member; and, FIG. 8 is a further embodiment of the subject invention showing schematically and in cut-away a bottle having a singular continuously formed liquid flow member displaced from a discontinuously formed liquid flow member.

As seen in the embodiment shown in FIG. 7, the configuration of bottle neck member 14 is formed with a pair of continuously formed liquid band members 26' and 26", each displaced from the other by a distance within the approximate range of 0.1 to 0.125 inches. As is the case in the preferred embodiment shown in FIGS. 1-3 and 4, continuously formed liquid band members 26' and 26" are substantially parallel each to the other and are formed in planes perpendicular to axis line 16.

Discontinuously formed liquid band member 28, having at least one flow block member 42 defining at least a pair of liquid flow passages 40 is displaced from continuously formed liquid band member 26' along the axis line 16 with a displacement distance within the range of 0.5 to 0.75 inches. The upper surface of discontinuous formed liquid band member 28 is maintained in the range of 0.375 to 0.50 inches from the neck lip 46. The geometrical constraints of discontinuously formed liquid band member 28 with respect to liquid flow passages 40 and the one or more flow block members 42 is maintained as shown in the embodiment depicted in FIGS. 1-3 and 4. It is seen that the use of two continuously formed liquid band members 26' and 26" has a slight effect on the visual interpretation of the produced standing wave during the pouring process, however still showing a continuous flow pattern shown in FIG. 4. Slight movement of the peaks 60 and troughs 62 was discernible to a slight extent.

Figure 8:
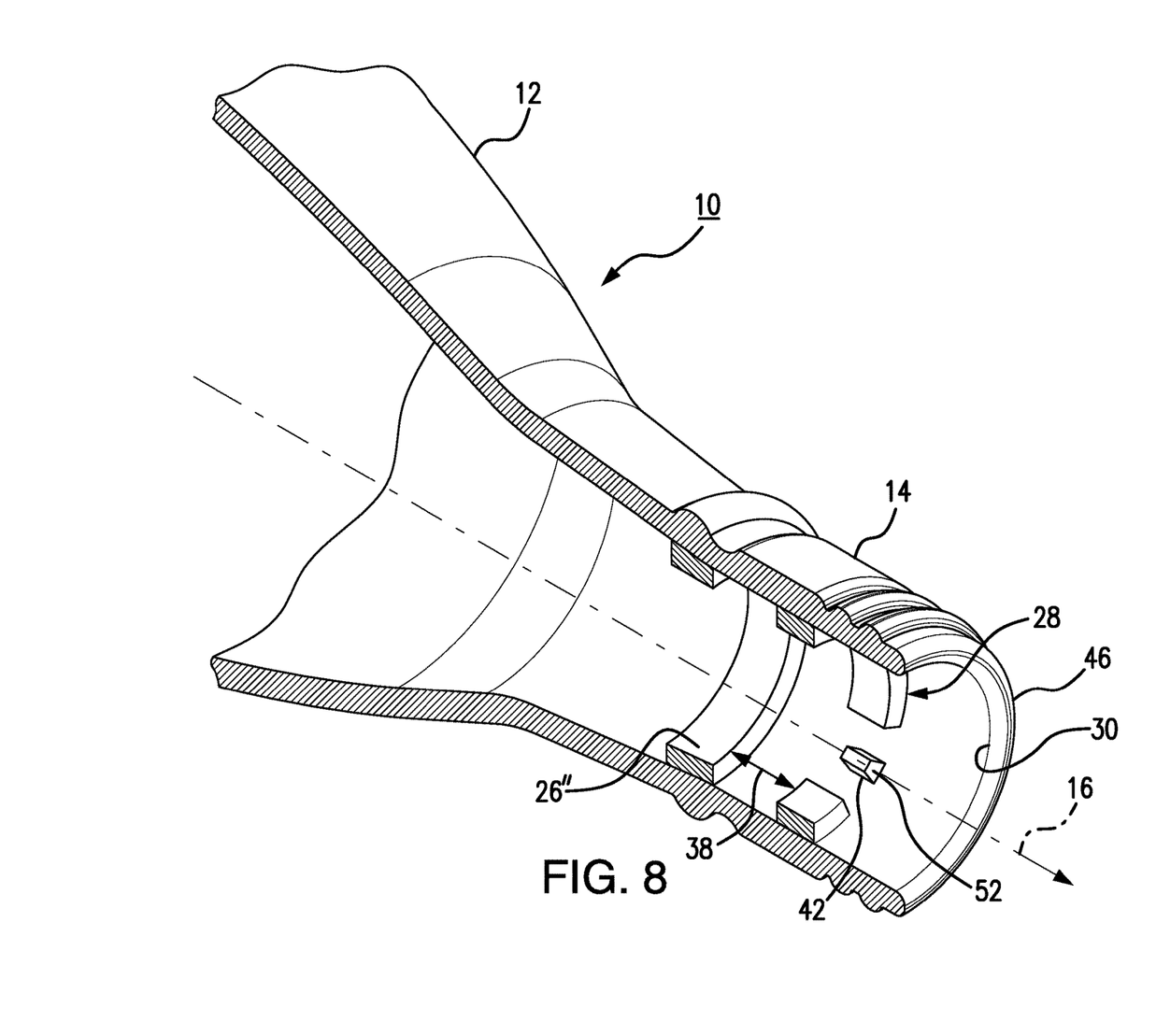

A further embodiment of the subject invention is shown in FIG. 8 where a singular continuously formed liquid band member 26" is mounted in bottle neck member 14 in combination with a singular discontinuously formed liquid band member 28. In the embodiment shown, although some movement of peaks 60 and troughs 62 were observed over the time of the pouring process, the standing wave conceptual visual response appears to be a function of the axis line 16 distance between the continuously formed liquid band member 26" and the discontinuously formed liquid band member 28. An increasing of the of the visual effect of the movement of the peaks 60 and troughs 62 was seen when the distance 38 was reduced below approximately 0.75 inches during a normal pouring process.

Although a singular discontinuously formed liquid band member having liquid passages 40 and intervening flow block members 42 is depicted in FIGS. 1-8, it is understood that a plurality of discontinuously formed liquid band members 28 sequentially displaced from each other may be mounted in the bottle neck member 14 having different geometries where the flow block members 42 of one discontinuously formed liquid band member are staggered with respect to a succeeding discontinuously formed liquid band member to provide a tortuous path of liquid 18 as it is dispensed from bottle 10. In this manner the flow block members serve as disruptors for the fluid flow and when used in conjunction with a least one continuously formed liquid band member 26 serve to decrease the visual displacement effect of the peaks 60 and troughs 62 during the pouring process.

Although this invention has been described in connection with specific forms and embodiments thereof, it will be appreciated that various modifications of those discussed above may be resorted to without departing from the spirit or scope of the invention. For example, functionally equivalent elements may be substituted for those specifically shown and described. It is understood, therefore, that this invention is not limited to the particular embodiments disclosed, but is intended to cover modifications within the spirit and scope of the present invention as defined by the appended Claims.

What is claimed is:

1. A bottle comprising:
   a bottle body member adapted to contain a liquid therein;
   a bottle neck member connected to said bottle body member and having an internal neck member surface having a substantially constant internal surface diameter and circumferential configuration, wherein said bottle neck member has an axis line;
   at least a first continuously formed liquid flow band member secured to said internal neck member surface and extending around said circumferential configuration of said internal neck member surface; and,
   at least one discontinuously formed liquid flow band member secured to said internal neck member surface and extending at least partially around said internal neck member surface, said discontinuously formed liquid flow band member having at least a pair of liquid passages formed therethrough which are equidistantly spaced apart from each other, said discontinuously formed liquid flow band member being displaced from said at least first continuously formed liquid flow band member along said axis line, wherein an interference flow pattern is produced for providing a liquid flow standing wave aesthetic effect as liquid is poured from the bottle.

2. The bottle as recited in claim 1, further including a plurality of continuously formed liquid flow band members secured to said internal neck member surface, said plurality of continuously formed liquid flow band members being displaced from each other along said axis line.

3. The bottle as recited in claim 2, where said plurality of continuously formed liquid flow band members are equidistantly displaced from each other and extend parallel to each other.

4. The bottle as recited in claim 2, where said continuously formed liquid flow band members are spaced apart from each other within the approximate range of 0.1-0.2 inches therebetween.

5. The bottle as recited in claim 2, further including at least a second continuously formed liquid flow band member displaced from said first continuously formed liquid flow band member along said axis line.

6. The bottle as recited in claim 5, further including at least a third continuously formed liquid flow band member displaced from said first and second continuously formed liquid flow band members along said axis line.

7. The bottle as recited in claim 2, wherein said plurality of continuously formed liquid flow band members are displaced from each other within a range of substantially 0.1-0.5 inches with respect to said axis line.

8. The bottle as recited in claim 1, where said at least first continuously formed liquid flow band member has a cross-sectional contour having a cross-sectional area in a plane extending along said axis line sized within the range of 0.02-0.04 square inches.

9. The bottle as recited in claim 8, wherein said bottle neck member is configured with a lip section, and wherein said at least first continuously formed liquid flow member is positioned within the range of 0.75-1.25 inches from said lip section of said bottle neck member.

10. The bottle as recited in claim 1, where said at least first continuously formed liquid flow band member has a substantially cross-sectional rectangular contour.

11. The bottle as recited in claim 1, where said at least first continuously formed liquid flow member includes an upper surface positionally located within the approximate range of 1.0-1.650 inches from a lip section of said bottle neck member.

12. The bottle as recited in claim 1, where said discontinuously formed liquid band member includes a plurality of flow block members circumferentially spaced apart from each other, thus defining said at least pair of said liquid passages between said flow block members.

13. The bottle as recited in claim 12, where each of said pair of liquid passages are positionally located substantially circumferentially equidistant from each other and on opposing angular sides of said axis line.

14. The bottle as recited in claim 13, where each of said pair of liquid passages has a substantially equal cross-sectional area with respect to an adjacent corresponding liquid passage.

15. The bottle as recited in claim 12, where an arc angle of said at least pair of liquid passages on opposing sides of a corresponding flow block member are substantially equal to each other.

16. The bottle as recited in claim 15, where each of said at least pair of liquid passages include a liquid flow cross-sectional area in a plane perpendicular to said axis line which is substantially equal to each other.

17. The bottle as recited in claim 12, where said at least pair of liquid passages formed by respective flow block members are symmetrically displaced from each other throughout at least a portion of the inner surface of said bottle neck member.

18. The bottle as recited in claim 12, further comprising an even number of liquid passages formed on said inner surface of said bottle neck member.

19. The bottle as recited in claim 18, where each of said liquid passages has a corresponding diametrically opposed liquid passage formed on said inner surface of said bottle neck member of equal cross-sectional flow area.

20. The bottle as recited in claim 19, where said diametrically opposed liquid passages have substantially equal liquid passage cross-sectional areas.

21. The bottle as recited in claim 12 where each of said block members includes a substantially cross-sectional rectangular contour.

22. The bottle as recited in claim 21, where each of said block members includes an upper surface positionally located within the approximate range of 0.3-0.4 inches from a lip section of said bottle neck member.

23. The bottle as recited in claim 1, where said bottle neck member includes an internal diameter within the range of approximately 0.645-0.875 inches.

24. A method of fabricating a bottle to produce a liquid flow standing wave aesthetic effect when a liquid is poured from the bottle comprising:
   establishing a bottle body having a bottle neck member connected to said bottle body, said bottle neck member having an internal surface of a substantially constant internal diameter throughout said bottle neck member length;

securing to said bottle neck member at least a first continuously formed liquid flow band member circumferentially extending around said internal surface of said bottle neck member; and, securing to said internal neck member surface at least one discontinuously formed band member extending at least partially around said internal neck member surface, said discontinuously formed member defining at least a pair of liquid passages formed therethrough which are equidistantly spaced apart from each other.

25. The method as recited in claim 24, where said at least two liquid passages are positionally located substantially circumferentially and equidistant from each other and on opposing sides of an axis line of said bottle neck member.

26. The method as recited in claim 24 where each of said at least two liquid passages has substantially the same flow cross-sectional area.

* * * * *